United States Patent [19]
Kaneda et al.

[11] Patent Number: 5,604,538
[45] Date of Patent: Feb. 18, 1997

[54] AUTOFOCUS APPARATUS UTILIZING LUMA AND CHROMA COMPONENTS TO DETERMINE WHETHER FOCUSING IS POSSIBLE

[75] Inventors: Kitahiro Kaneda; Hirofumi Takei, both of Yokohama, Japan

[73] Assignee: Canon Kabushiki Kaisha, Tokyo, Japan

[21] Appl. No.: 189,298

[22] Filed: Jan. 31, 1994

Related U.S. Application Data

[63] Continuation of Ser. No. 763,803, Sep. 23, 1991, abandoned.

[30] Foreign Application Priority Data

Sep. 25, 1990 [JP] Japan .................................. 2-255944

[51] Int. Cl.⁶ ........................... G03B 13/00; H04N 5/232
[52] U.S. Cl. ......................... 348/353; 348/346; 348/354; 348/345
[58] Field of Search ........................ 348/349, 353 OR, 348/354, 355, 345, 346, 347, 348, 356; 354/403, 404, 400, 409; H04N 5/225

[56] References Cited

FOREIGN PATENT DOCUMENTS

| | | | |
|---|---|---|---|
| 1-187519 | 7/1989 | Japan | G03B 3/00 |
| 1-185083 | 7/1989 | Japan | H04N 5/232 |
| 1-212981 | 8/1989 | Japan | H04N 5/232 |
| 1-228276 | 9/1989 | Japan | H04N 5/232 |
| 2-214272 | 8/1990 | Japan | H04N 5/232 |
| 2-285876 | 11/1990 | Japan | H04N 5/232 |
| 4-180477 | 6/1992 | Japan | H04N 5/232 |

*Primary Examiner*—John K. Peng
*Assistant Examiner*—John W. Miller
*Attorney, Agent, or Firm*—Robin, Blecker, Daley & Driscoll

[57] ABSTRACT

An image pickup apparatus includes a focus detector for extracting a focus signal according to a focus condition and for executing a focus adjustment, a detector for detecting chrominance level and luminance level in an image pickup plane from an image pickup signal output from an image sensor, a discriminator for discriminating an image pickup condition of the image pickup plane on the basis of an output of the detector and discriminating a predetermined low contrast condition where the detected chrominance and luminance levels are less than predetermined levels and a controller for controlling the focus detector on the basis of the focus signal and inhibiting a focus adjusting operation of the focus detector or reducing a speed thereof in accordance with a discriminating result of the discriminator.

20 Claims, 6 Drawing Sheets

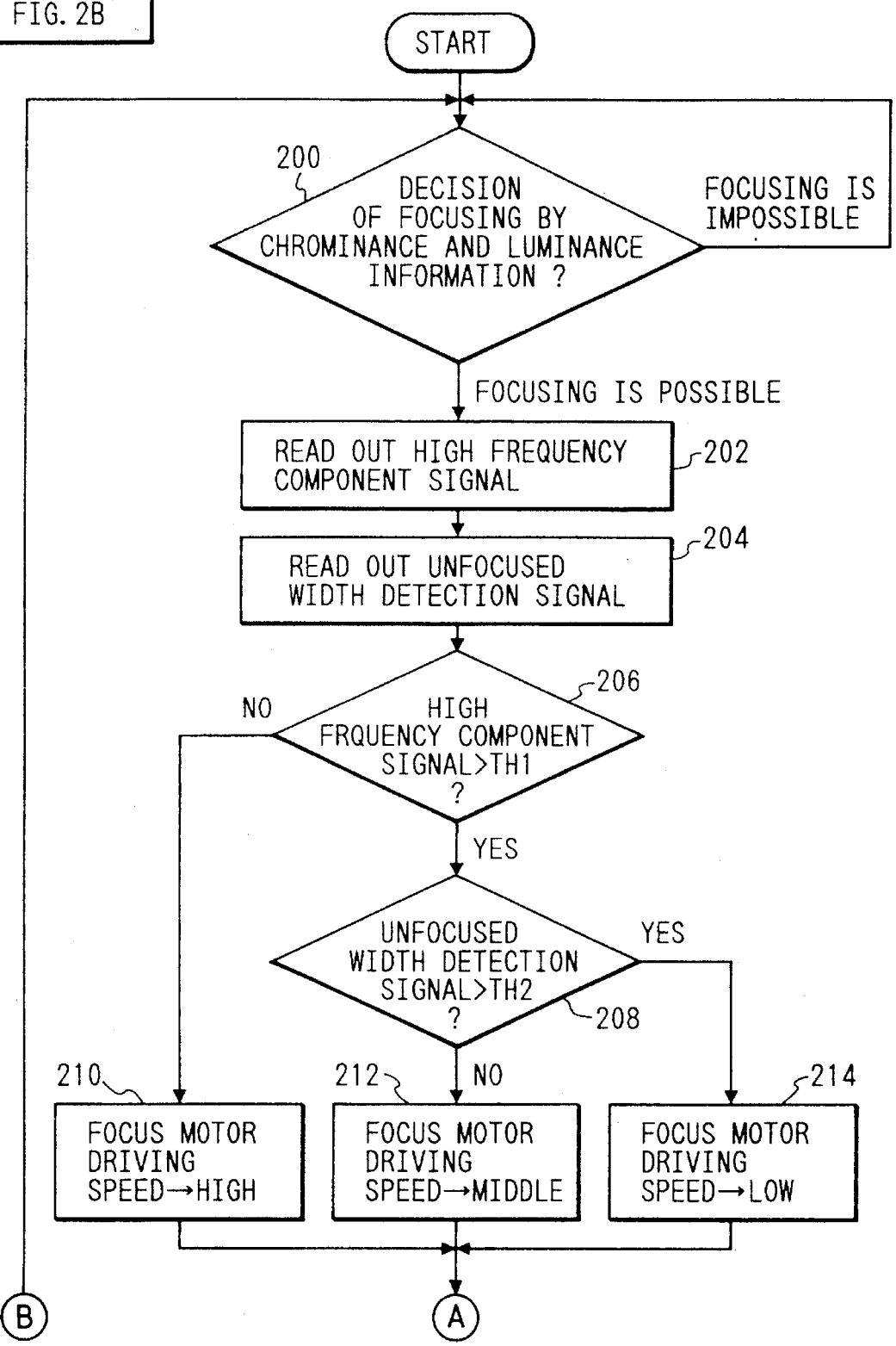

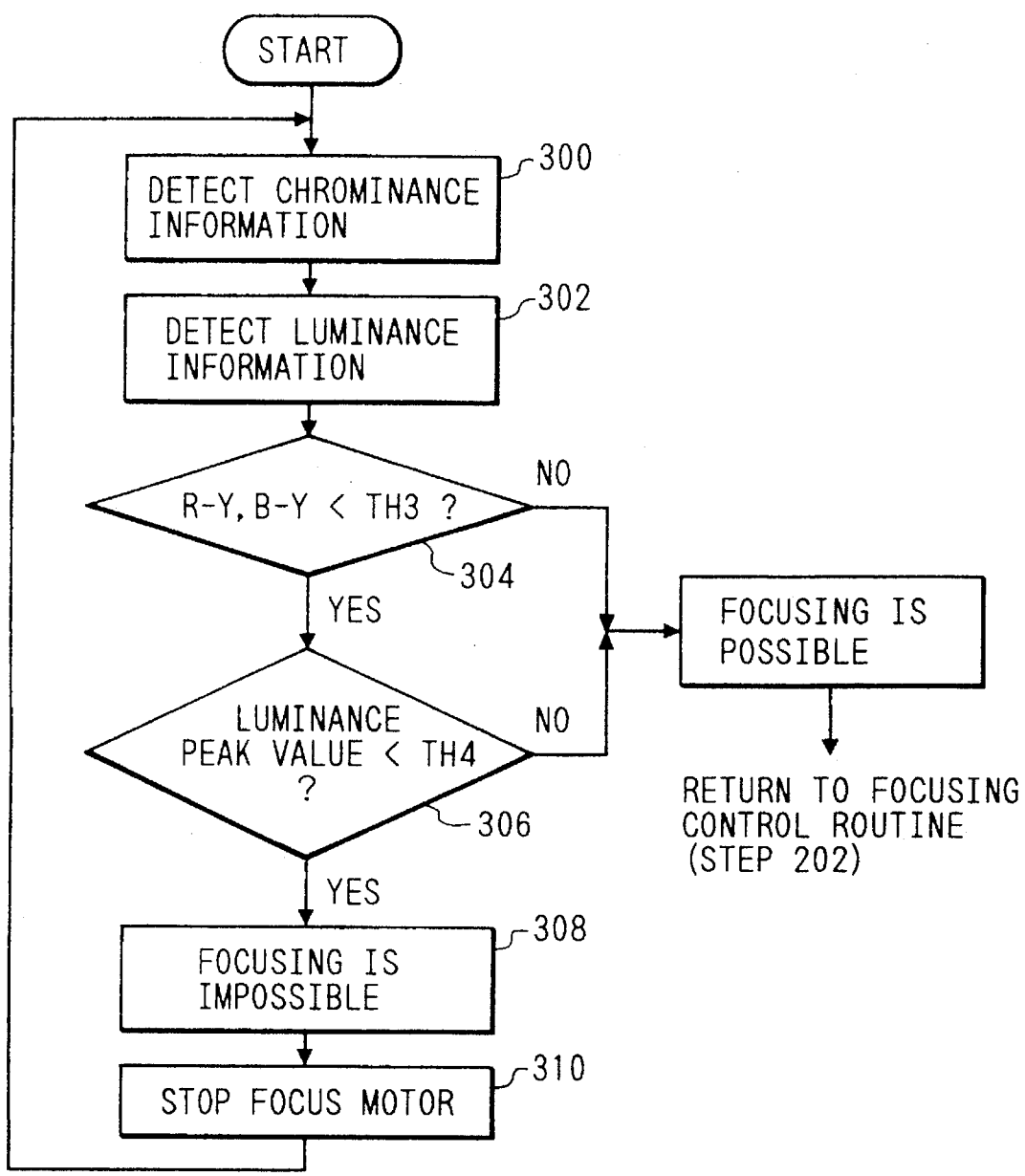

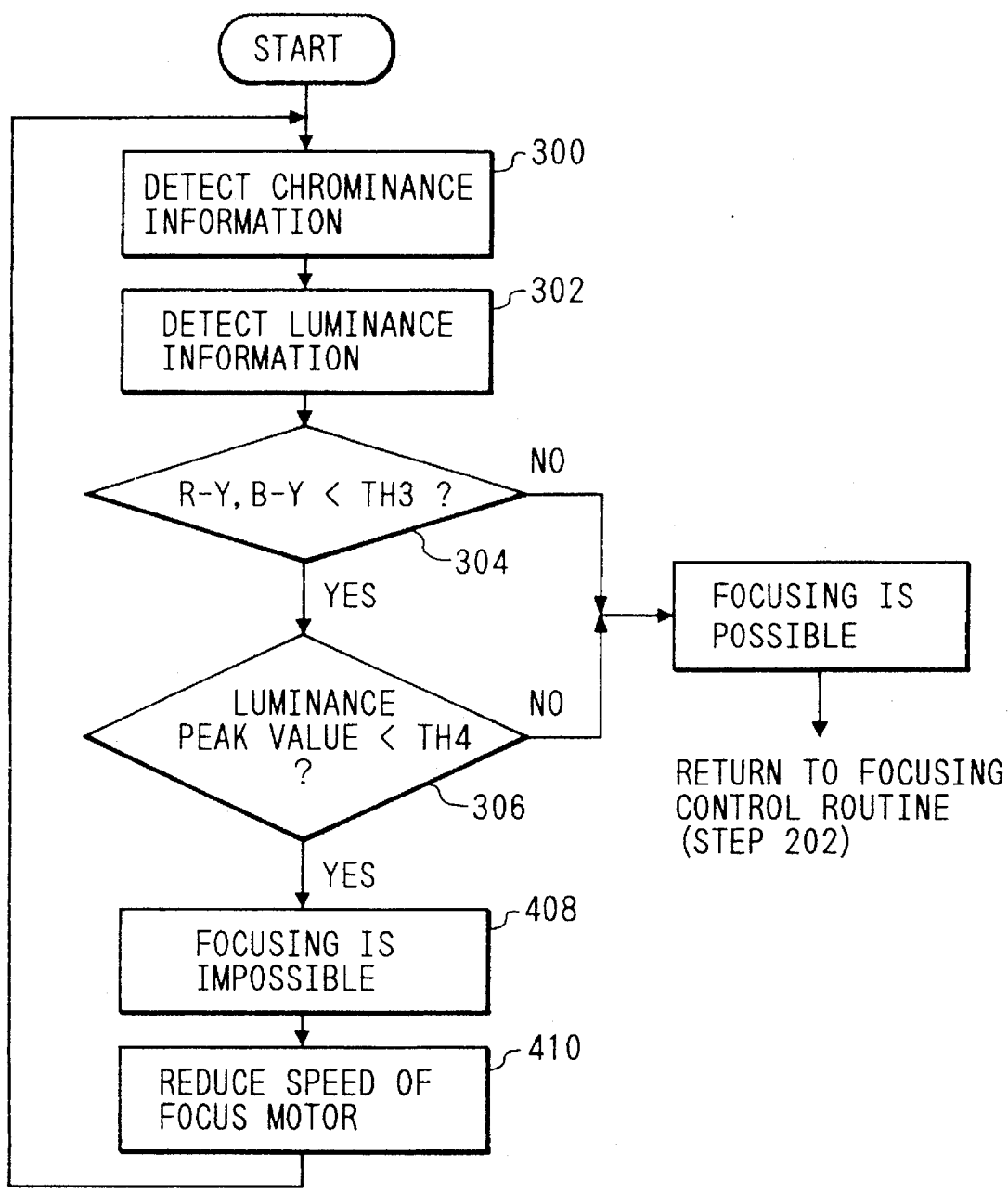

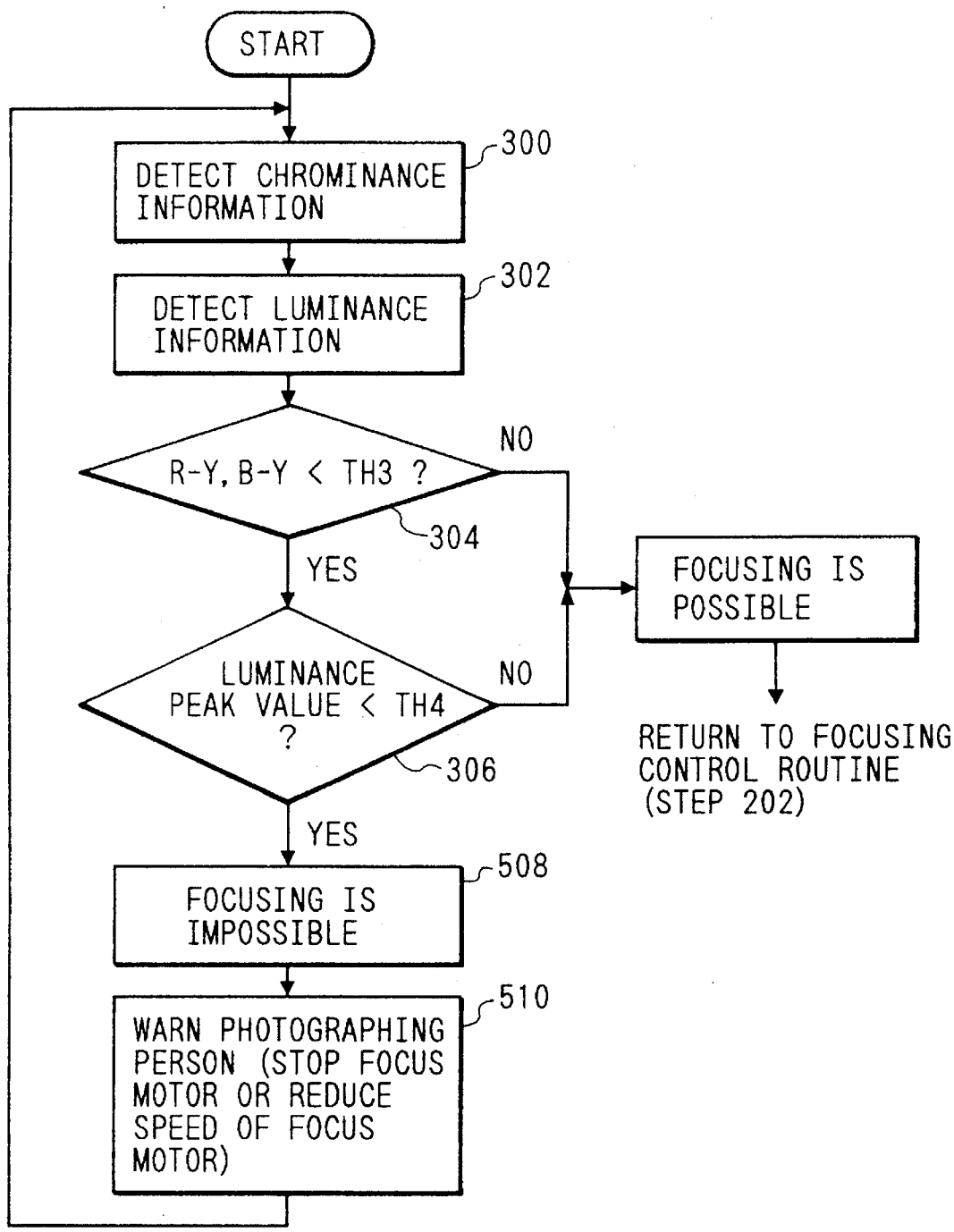

AUTOFOCUS APPARATUS UTILIZING LUMA AND CHROMA COMPONENTS TO DETERMINE WHETHER FOCUSING IS POSSIBLE

This is a continuation application under 37 CFR 1.62 of prior application Ser. No. 07/763,803, filed Sep. 23, 1991 now abandoned.

BACKGROUND OF THE INVENTION

1. Field of the Invention

The invention relates to an image pickup apparatus which is suitable for use in a video apparatus such as video camera, electronic still camera, or the like.

2. Related Background Art

In recent years, the development of video apparatus including video cameras, electronic still cameras, and the like has been remarkable. Particularly, in order to improve the function and operating efficiency, the functions such as automatic focal point adjusting apparatus (AF) and the like have been installed as standard functions.

In the automatic focal point adjusting apparatus, a method whereby a sharpness of the screen is detected from a video signal obtained by photoelectrically converting an object image by an image pickup device or the like and a focusing lens position is controlled so as to obtain the maximum sharpness to thereby execute a focal point adjustment is main stream.

Generally, a magnitude of a high frequency component of a video signal extracted by a band pass filter (BPF), a detection magnitude of an unfocused width (width of the edge portion of an object image) of a video signal extracted by a differentiating circuit or the like is used as a value for evaluation of the sharpness.

When an ordinary object image has been photographed, a level of a high frequency component is small and an unfocused width is blurred and widened in an unfocused state. As a focusing state approaches an in-focus state, the level of high frequency component rises and the unfocused width decreases. In a complete in-focus state, the high frequency component level becomes maximum and the unfocused width becomes minimum. Therefore, the focusing lens is controlled in a manner such that when the sharpness is low, the focusing lens is driven at the highest possible speed so as to raise the sharpness, the driving speed is reduced as the sharpness rises, and the driving of the focusing lens is stopped at a summit of the mountain of sharpness with a high precision. Such a control method is generally called a mountain climbing auto focusing method (mountain climbing AF).

By using such an automatic focal point adjusting apparatus, particularly, in a conventional video camera or the like to photograph a moving image, the operating efficiency is remarkably improved and such an AF is an inevitable function in recent years.

According to the automatic focal point adjusting apparatus of the mountain climbing AF method as mentioned above, however, for instance, in the case where a power source has been turned on with a lens cap attached or in the case where an object is photographed in a state of a low illuminance, a sharpness signal of a photographed image deteriorates as a whole and it is difficult to detect a focusing degree.

Thus, there is a problem such that a focus motor cannot be stopped at an in-focus point with a high precision and what is called a hunting occurs.

Such a hunting state gives an extremely unpleasant feeling to a photographing person and, further, causes troubles such as increases in electric power consumption and motor driving noises, deterioration in durability of the focusing driving system, and the like.

SUMMARY OF THE INVENTION

The invention is made to solve the above problems and it is an object of the invention to provide an automatic focal point adjusting apparatus without a malfunction.

Another object of the invention is to provide an automatic focal point adjusting apparatus in which, for instance, in the case where a power source has been turned on with a lens cap attached, the case where the lens cap has been attached before an automatic focal point adjusting operation is cancelled, or the case where an object is photographed in a state of an extremely low illuminance, by controlling focal point detecting means by discriminating a situation of an image pickup screen, a harmful hunting or the like in a impossible focusing state is reduced and the optimum automatic focal point adjusting operation without a malfunction and comfortable photographing can be executed.

To accomplish the above objects, according to a preferred embodiment of the invention, there is disclosed an image pickup apparatus comprising focal point detecting means for extracting a signal according to a focusing degree from an image pickup signal and for executing a focal point adjustment, detecting means for detecting chrominance information and luminance information in an image pickup screen from the image pickup signal, discriminating means for discriminating a situation of the image pickup screen on the basis of an output of the detecting means and control means for controlling the focal point detecting means in accordance with the result of the discrimination of the discriminating means.

The above and other objects and features of the present invention will become apparent from the following detailed description and the appended claims with reference to the accompanying drawings.

BRIEF DESCRIPTION OF THE DRAWINGS

FIG. 2 is a diagram showing the relationship between FIGS. 2a and 2b.

FIG. 2a and 2b are a flowchart for explaining a control operation in the image pickup apparatus of the invention;

FIG. 3 is a flowchart for explaining a control operation of photographing state discriminating means in the image pickup apparatus of the invention;

FIG. 4 is a flowchart showing another embodiment of a control operation of the image pickup apparatus of the invention; and FIG. 5 is a flowchart showing still another embodiment of a control operation of the image pickup apparatus of the invention.

DETAILED DESCRIPTION OF THE PREFERRED EMBODIMENTS

An automatic focusing apparatus according to an embodiment of the invention will be described in detail hereinbelow with reference to the drawings.

Figure 1:
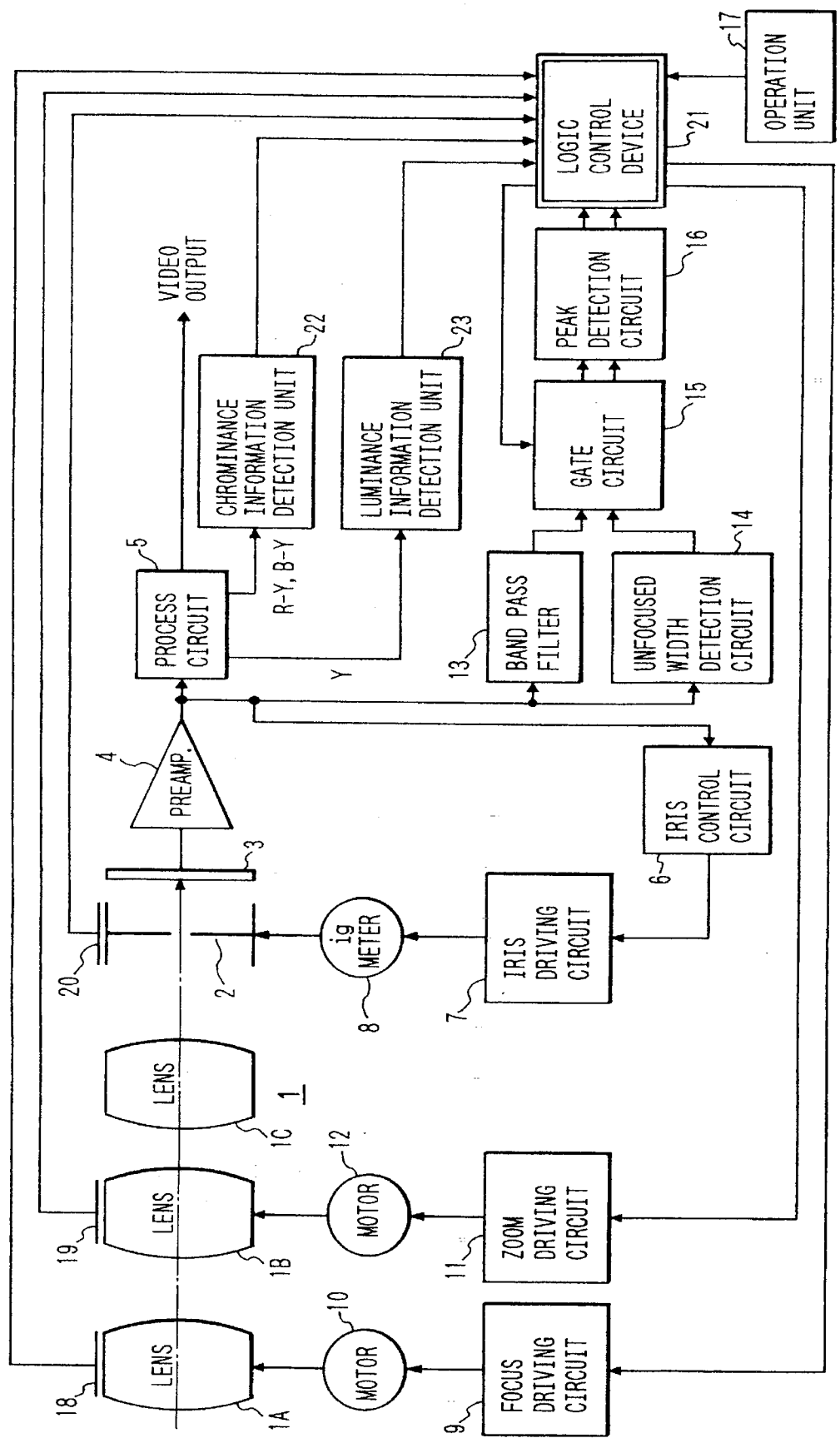
FIG. 1 is a block diagram showing a construction in the case where an image pickup apparatus according to the invention has been applied to a video camera.

FIG. 1 is a block diagram showing the case where a lens control apparatus of the invention has been applied to a video camera.

In the diagram, reference numeral 1 denotes a photographing lens system comprising a focusing lens group 1A using a front lens to execute a focal point adjustment, a zoom lens group 1B to execute a focal point adjustment in a wide macro region together with a zooming operation, and a lens group 1C of a correcting system (hereinafter, referred to as a focusing lens, a zoom lens, and a correcting lens, respectively).

The focusing lens 1A is driven and controlled by a focus driving circuit 9 and a focus motor 10. The zoom lens 1B is driven and controlled by a zoom driving circuit 11 and a zoom motor 12. Reference numeral 2 denotes a diaphragm (iris) to control an incident light amount. The iris 2 is driven and controlled by an iris driving circuit 7 and an ig meter 8 for driving the iris. Reference numeral 3 denotes an image pickup device such as a CCD or the like for photoelectrically converting an object image formed onto an image pickup surface by the focusing lens 1A and for generating an image pickup signal; 4 a preamplifier to amplify the image pickup signal generated from the image pickup device 3 to a predetermined level; and 5 a process circuit for executing predetermined processes such as gamma correction, blanking process, addition of a sync signal, and the like to a video signal generated from the preamplifier 4, for converting the video signal into a standard television signal which has been standardized, and for generating from a video output terminal. The TV signal generated from the process circuit 5 is supplied to a video recorder, an electronic view finder, or the like (not shown).

Reference numeral 6 denotes an iris control circuit for receiving the video signal generated from the preamplifier 4 and for automatically controlling the ig meter 8 through the iris driving circuit 7 in order to control an opening amount of the iris 2 so that a level of the video signal is set to a predetermined level.

Reference numeral 13 denotes a band pass filter (BPF) to extract a high frequency component necessary to execute a focusing detection from the video signal generated from the preamplifier 4. Reference numeral 14 denotes a detecting circuit to detect an unfocused width (width of the edge portion of an object image) of an object image from the video signal. A focusing detection is executed by using a nature such that an unfocused width of the object decreases as a focusing state approaches an in-focus state. Since a focusing detecting method itself by the unfocused width detecting circuit has been well known by, for example, Japanese Laid-Open Patent Application No. 62-103616 or the like, its detailed description is omitted here.

Reference numeral 15 denotes a gate circuit for executing gating processes to outputs of the BPF 13 and the unfocused width detecting circuit 14 and for allowing only the signal corresponding to the inside of a designated region on the image pickup screen or surface to pass. In accordance with gate pulses which are supplied from a logical control device 21, which will be explained herein, the gate circuit 15 allows only the signal corresponding to the designated region in the video signal of one field to pass, thereby enabling a passing region to extract the high frequency component, that is, a focusing detection region to execute the focusing detection to be set to an arbitrary position in the image pickup screen. Reference numeral 16 denotes a peak detection circuit for detecting a peak value of the high frequency component, a peak value (minimum value of the unfocused width) of unfocused width information, and positions in the horizontal and vertical directions in the image pickup screen in which the peak value of the high frequency component has been obtained from the video signal corresponding to the inside of the focusing detection region extracted by the gate circuit 15. The peak detection circuit 16 detects the peak value detected in a period of time of one field and also detects at which one of the blocks obtained by dividing the focusing detection region in a predetermined number of blocks in the horizontal and vertical directions the peak value is located, thereby generating horizontal and vertical coordinates.

Reference numeral 17 denotes an operation unit having a plurality of switches for executing various kinds of control operations regarding the operation of the video camera such as zooming operation, AF mode switching, on/off of the wide macro AF, setting of a high speed shutter, and the like.

Reference numeral 18 denotes a focus encoder to detect a moving position of the focusing lens 1A; a zoom encoder to detect focal point distance information which can be varied by the zoom lens 1B; and 20 an iris encoder to detect an opening amount of the iris 2. The detection information of those encoders 18 to 20 are sent to the logical control device 21.

Reference numeral 22 denotes a chrominance information detection unit for extracting chrominance information signals (color difference signals R-Y and B-Y) from the image pickup signal which is processed by the process circuit, for detecting a saturation in the screen, and for supplying to the logical control device 21. Reference numeral 23 denotes a luminance information detection unit for detecting a brightness in the screen from a luminance information signal (luminance signal Y) extracted from the image pickup signal and for supplying to the logical control device 21.

Reference numeral 21 denotes the logical control device to integratedly control the whole system. The logical control device is constructed by, e.g., a microcomputer and has therein an input/output port, an A/D converter, a read only memory (ROM), and a random access memory (RAM) (which are not shown). The logical control device 21 receives the peak value in the period of time of one field of the high frequency component based on an output of the BPF 13 which has been generated from the peak detection circuit 16, the coordinates-of the peak position, unfocused width information based on an output of the unfocused width detection circuit 14, and the detection information from the encoders 18, 19, and 20. Then, the logical control device 21 performs arithmetic operations in accordance with a predetermined algorithm on the basis of the received information. The device 21 subsequently sets a position on the image pickup screen in the focusing detection region, a size, a moving direction, and a moving response speed from time sequential changes of the above information, that is, executes an object tracing operation and also calculates a moving direction, a moving speed, and the like of the focusing lens at which an in-focus point is derived.

Namely, on the basis of the peak value in one field period of time of the high frequency component based on the output of the BPF 13 and the peak position coordinates, the movement of the object is detected every field. Gate pulses are supplied to the gate circuit 15 in order to set the focusing detection region to the changed peak position, that is, the position where the object position is a center, thereby opening or closing the gate circuit 15 and allowing only the video signal of the portion corresponding to the inside of the focusing detection region of the video signal to pass.

On the basis of the video signal corresponding to the inside of the focusing detection region which has been set as mentioned above, the logic control device 21 executes a focusing detection for an object, thereby performing a focal point adjustment. That is, the logical control device 21 receives the unfocused width information supplied from the unfocused width detection circuit 14 and the peak value (or integrated value) information of the high frequency component supplied from the BPF 13. The logical control device 21 supplies control signals regarding a rotating direction, a rotating speed, rotation/stop, and the like of the focus motor 10 to the focus driving circuit 9 in order to drive the front focusing lens 1A and controls the focus motor 10 on the basis of the time sequential changes of the received information so that the focusing lens 1A is set to the position at which the unfocused width value in one field period of time becomes minimum and the peak value of the high frequency component becomes maximum, that is, the focusing degree always becomes maximum.

In the above state, the logical control device 21 receives the detection values of the focus encoder 18, zoom encoder 19, and iris encoder 20 and refers to a depth of field, a position of the focusing lens, and the like and executes a control adapted to a photographing state which is indicated by them.

The logical control device 21 also controls a size of focusing detection region, a moving range, and a moving response speed in accordance with the focusing degree, an iris value detected by the iris encoder 20 and zoom encoder 19, and a depth of field calculated from a focal point distance.

As mentioned above, a focal point can be continuously accurately set while tracing a moving object image.

The reasons why the unfocused width signal generated from the unfocused width detection circuit 14 and the peak value of the high frequency component generated from the BPF 13 are used to perform the focusing detection in the invention are as follows.

That is, there is a feature such that the unfocused width has a small value as the focusing point approaches the in-focus point, the unfocused width becomes minimum at the in-focus point and is hardly influenced by the contrast of the object, so that a high focusing detecting precision can be obtained. However, a dynamic range is narrow and if the focusing state is largely deviated from the in-focus point, an adequate detecting precision cannot be obtained.

On the other hand, the high frequency component has a feature such that a dynamic range is wide and even if a focusing state is largely deviated from an in-focus point, an output according to the focusing degree can be obtained, but the high frequency component is largely influenced by the contrast. A focusing precision similar to that in the case of the unfocused width information cannot be obtained.

Therefore, by combining them, it is possible to realize a focusing detecting method in which a dynamic range is wide and a high detecting precision is derived at a position near the in-focus point.

In the embodiment, the mountain climbing AF is executed on the basis of the level of the high frequency component as a whole and the unfocused width information is used for a focusing discrimination at a position near the in-focus point or a discrimination about a reactivation or the like.

The logic control device 21 discriminates the permission or inhibition of the focusing operation on the basis of the chrominance information and luminance information of the image pickup screen as will be explained herein.

Figure 2B:
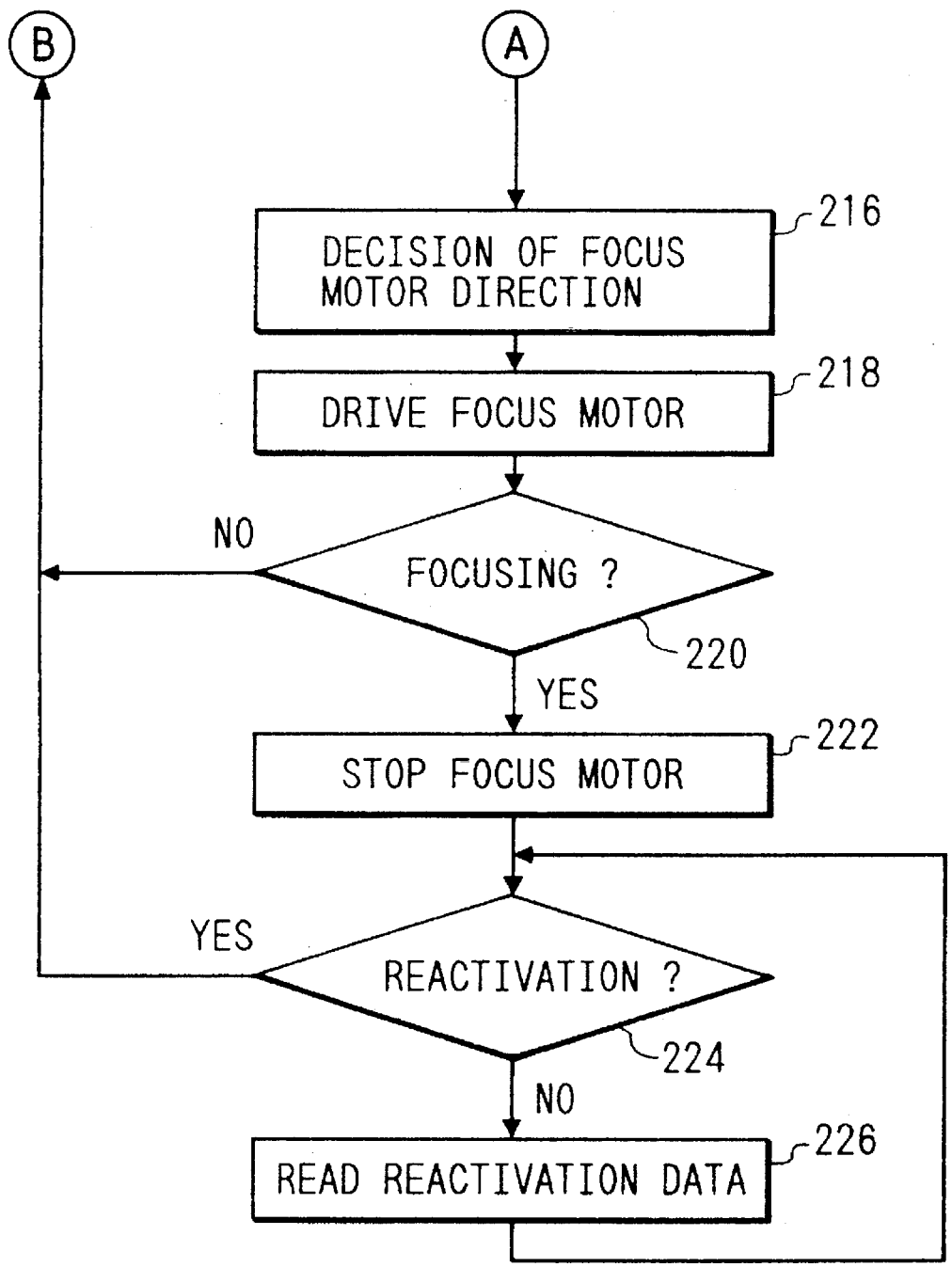

The focal point control operation by the logic control device 21 in the image pickup apparatus according to the invention will now be described with reference to a flowchart shown in FIG. 2 in accordance with the order of processing steps.

In the diagram, when a control flow is started, first, in step 200, a peak value of the saturation and a peak value of the luminance in the image pickup screen which have been detected respectively by the chrominance information detection unit 22 and the luminance information detection circuit 23 are detected, thereby discriminating the permission or inhibition of the subsequent focusing operation control. The above processing routine relates to a main section of the invention and the detailed operation will be described herein.

If it is determined in step 200 that the focusing operation can be performed, step 202 follows and an analog value of the high frequency component in the video signal supplied from the BPF 13 in FIG. 1 is A/D converted and supplied to the logical control device 21 every field. The processing routine advances to step 204 and an analog value of the unfocused width of the edge portion of the object which is supplied from the unfocused width detection circuit 14 is also likewise A/D converted and is supplied to the logical control device 21 every field.

In step 206, a driving speed of a focus motor is determined from the level of the extracted value of the high frequency component which has been detected in step 202. When a value of the driving speed is smaller than a predetermined threshold value $TH_1$, step 210 follows and the speed of the focus motor is set to the maximum value. If it is larger than $TH_1$, step 208 follows and a routine to decide a driving speed of the focus motor by the unfocused width detection value is executed.

In step 208, if a level of the unfocused width detection signal (although the unfocused width decreases as the focusing state approaches the in-focus point, a data signal which is actually used is made to correspond to a level change of the high frequency component and is converted into the data such that the level becomes maximum at the in-focus point by using a reciprocal number of the unfocused width and such data is used) which has been detected in step 204 is smaller than a threshold value $TH_2$, step 212 follows and a driving speed of a motor to drive the focusing lens is set to a middle speed. In the other cases, namely, if the level of the unfocused width detection signal is larger than the threshold value $TH_2$, it is decided that the focusing position is extremely close to the in-focus point, so that step 214 follows and the driving speed of the focus motor is set to the minimum value.

After the absolute value of the driving speed of the focus motor was set by the focus motor driving speed deciding routine in steps 206 to 214 as mentioned above, the processing routine advances to step 216 and the direction of the motor to drive the focusing lens is determined by time sequential changes of the high frequency component detection value and the unfocused width detection value. That is, when the time sequential changes are increasing, it is decided that the focusing lens is moving in such a direction as to approach the in-focus point. The driving direction of the focus motor is maintained to the present direction. When the time sequential changes are decreasing, it is determined that the focusing lens is away from the in-focus point. The driving direction of the focus motor is reversed.

In step 218, the focus motor is actually driven on the basis of the speed set in steps 206 to 214 and the driving direction set in step 216, thereby moving the focusing lens.

In step 220, a check is made to see if the in-focus state has been obtained or not on the basis of degrees of changes of the high frequency component detection value and the unfocused width detection value. If it is decided that those change degrees are small and a control point has reached the summit of the mountain in what is called a mountain climbing AF operation and the in-focus state has been obtained, the processing routine advances to step 222 and the focus motor is stopped. If it is determined that the time sequential changes of the high frequency component detection value and the unfocused width detection value have continued and the focusing state doesn't yet reach the in-focus point, the processing routine is returned to step 200 and the above processes are repeated.

After the focus motor was stopped in step 222, the processing routine advances to a reactivation discriminating routine in step 224. In step 224, a check is made to see if the in-focus state has continued after the focus motor had been stopped because the in-focus state had been derived or the focusing state is deviated from the in-focus state due to the movement of the object or the like on the basis of a decreasing state of the level of the unfocused width detection value. If the focusing state is deviated from the in-focus state, the processing routine is returned to step 200 in order to reactivate the focus motor.

In the reactivation routine in step 224, if it is determined that the in-focus state is held and there is no need to reactivate, the processing routine advances to step 226 and the unfocused width detection value is repeatedly read as fundamental data to judge the reactivation until the reactivation is instructed.

A fundamental control flow of the automatic focusing operation according to the invention is as mentioned above. The process in step 200 as a main section of the invention will now be described with reference to a flowchart of FIG. 3.

In step 200, as mentioned above, the peak value of the saturation and the peak value of the luminance in the image pickup screen which have been detected by the chrominance information detection unit 22 and the luminance information detection unit 23 are detected, thereby judging the permission or inhibition of the subsequent focusing operation control.

In FIG. 3, when a control is started, the peak value of the saturation in a predetermined area in the screen, that is, maximum values $C_{RMAX}$ and $C_{BMAX}$ of the amplitudes of the color difference signals R-Y and B-Y which are generated from the process circuit 5 are first detected in step 300.

In step 302, a maximum value $Y_{MAX}$ of the luminance signal in the same region as the region on the image pickup screen from which the saturations, i.e., the color difference signals have been detected, is detected.

In step 304, the maximum values $C_{RMAX}$ and $C_{BMAX}$ are respectively compared with a predetermined threshold value $TH_3$. If it is determined that they are smaller than $TH_3$, step 306 follows and the peak value of the luminance signal level is discriminated. If at least one of the levels of $C_{RMAX}$ and $C_{BMAX}$ is equal to or larger than $TH_3$, it is determined that the focusing operation can be performed and a focusing control routine in step 202 and subsequent steps in FIG. 2 are executed.

If it is decided in step 304 that $C_{RMAX}$ and $C_{BMAX}$ are smaller than $TH_3$, the processing routine advances to step 306 and the peak value $Y_{MAX}$ of the luminance signal level is compared with a threshold value $TH_4$.

If $Y_{MAX}$ is smaller than $TH_4$, it is determined in step 308 that the focusing operation is impossible. Step 310 follows and the focus motor is stopped and the focusing lens is not driven. The processing routine is returned to step 300 and the above discriminating operations are repeated. At this time, the stop position of the focusing lens can be set to a position just before it is stopped or can be also set to an intermediate point in a lens moving range in consideration of that the focusing lens is subsequently activated.

If $Y_{MAX}$ is equal to or larger than $TH_4$ in step 306, it is decided that the focusing operation can be performed. A focusing control routine in step 202 and subsequent steps in FIG. 2 is executed.

As mentioned above, by comparing the peak values of the levels of the color difference signals and the luminance signal with the predetermined threshold values, a check is made to see if the focusing operation can be performed or not. Therefore, it is possible to prevent inconveniences such that the focusing lens executes a vain unexpected erroneous operation in a photographing state in which the focusing operation itself is impossible, electric power is consumed, noises are generated, and the like.

The reasons why the focusing operation is determined to be impossible in the case where both of the peak values of the saturations (color difference signals) and the luminance signal are equal to or smaller than the predetermined values will now be described.

Generally, in dependence on an object on the image pickup screen, it is impossible to perfectly judge whether the AF operation is unnecessary or is impossible in a state in only the case where the saturation of the color is merely small or the screen is merely dark.

That is, if a judgment regarding whether the focusing operation can be performed or not is executed by only the luminance level which is ordinarily used in the focusing detecting operation, there is a danger such that the focusing lens is stopped in the case of a low luminance in spite of the fact that an object exists. Therefore, if the threshold value which is used to stop the focusing lens is reduced to thereby make it difficult to stop the focusing lens, a hunting easily occurs and the operation becomes unstable.

In the invention, accordingly, the chrominance information is also used to judge whether the focusing can be performed or not. When the chrominance information is derived, it is determined that the object exists, so that the focusing operation is executed. The focusing lens is stopped in the case where the detection itself of an object having none of the luminance level and the chrominance information is impossible.

For instance, as a typical example in which the focusing operation is impossible, there can be mentioned a state in which the lens cap has been attached. If the focusing detecting operation is executed in such a state, the focusing lens continuously moves in a state in which an in-focus point cannot be detected. There is a fear such that a hunting occurs, an unexpected malfunction occurs, an operating feeling is bad, and a large unfocused state contrarily occurs. Further, such a state results in causes of electric power consumption, noises, and the like.

According to the invention, both information of the color difference signals and the luminance signal are detected and both of those levels are discriminated in a lump, thereby certainly discriminating the case where the AF operation is completely impossible or unnecessary. In the case where the focusing is impossible, the driving of the focusing lens is inhibited and the above problems can be prevented.

On the other hand, as for an object of a low illuminance or the like, in the case where the object can be discriminated by the chrominance information, the AF operation is executed. Consequently, it is possible to avoid an inconvenience such that the focusing operation cannot be performed due to a low luminance in spite of the fact that the object exists.

As mentioned above, according to the invention, by judging whether the focusing operation can be performed or not by effectively using the chrominance information and the luminance information, the case where the AF operation is unnecessary such as in the case where the lens cap has been attached is certainly discriminated. A harmful malfunction such as a hunting or the like can be reduced.

According to the embodiment, if it is determined that the focusing is impossible, the focus motor is stopped. However, the invention is not limited to the above method. For instance, the speed of the focus motor can be also reduced as shown in a flowchart of FIG. 4.

In the above case, step 310 in the flowchart of FIG. 3 is replaced to step 410. In step 410, the focus motor is not stopped but the speed is reduced. Since the other processes are substantially the same as those shown in the flowchart of FIG. 3, those processing steps are designated by the same reference numerals and their descriptions are omitted here.

If it is determined that the focusing is impossible, as shown in a flowchart of FIG. 5, it is also possible to construct in a manner such that a warning indication is displayed in the electronic view finder, a frame of the focusing detection region is flickered or erased or the like, thereby allowing the operator to recognize the focusing impossible state.

In this case as well, step 310 in the flowchart of FIG. 3 is replaced to step 510 to display a warning as shown in FIG. 5.

In the above case, the process in step 510 can be also used together with the process to stop the focusing lens or the process to reduce the speed of the focusing lens as in the embodiments of FIGS. 3 and 4.

As described above, according to the image pickup apparatus of the invention, the chrominance information and the luminance information in the image pickup screen are detected and a situation of the image pickup screen is discriminated and a check is made to see if the focusing operation can be performed or not on the basis of the result of the discrimination. Therefore, for example, when a power source has been turned on with the lens cap attached or the lens cap has been attached before the AF operation is cancelled, or even in the case of photographing at an extremely low illuminance, by controlling the focal point detecting means by judging a situation of the image pickup screen, a harmful hunting or the like can be reduced and the optimum automatic focal point adjusting operation without a malfunction and a comfortable photographing can be performed. Thus, the optimum speed control can be executed.

We claim:

1. An image pickup apparatus comprising:
   (A) focus adjusting means for extracting a signal which changes in accordance with a focus condition from an image pickup signal and for driving a focusing lens so that a level of said signal is set to an extremal value;
   (B) detecting means for detecting saturation information and brightness information of an object from the image pickup signal; and
   (C) control means for controlling the focus adjusting means on the basis of the extracted signal and for substantially inhibiting the operation of the focus adjusting means in response to detection of a saturation and a brightness which respectively are less than predetermined levels corresponding to a low contrast condition.

2. An apparatus according to claim 1, wherein the focus adjusting means detects a focus condition in accordance with levels of signals regarding a high frequency component extracted from the image pickup signal and an edge width of an object image, thereby executing a focal point adjustment.

3. An apparatus according to claim 1, wherein the detecting means extracts color difference signals and a luminance signal from the image pickup signal and the control means compares levels of said color difference signals and said luminance signal with predetermined levels, respectively, thereby discriminating a contrast of an object.

4. An apparatus according to claim 3, wherein the control means inhibits the operation of the focus adjusting means in the case where it is determined that the contrast of the object is so low that the image pickup is impossible.

5. An apparatus according to claim 4, wherein the control means stops the driving of the focusing lens or reduces a driving speed thereof in the case where it is determined that the image pickup is impossible.

6. An apparatus according to claim 4, further having warning means for performing a warning indication in the case where the detecting means has generated the result of the discrimination indicating that the image pickup of the object is impossible.

7. An image pickup apparatus comprising:
   (A) focus detecting means for extracting a focus signal according to a focus condition and for executing a focus adjustment;
   (B) detecting means for detecting chrominance level and luminance level in an image pickup plane from an image pickup signal output from image sensing means;
   (C) discriminating means for discriminating an image pickup condition of the image pickup plane on the basis of an output of said detecting means and discriminating a predetermined low contrast condition in the case of that said chrominance level and luminance level are less than predetermined levels respectively; and
   (D) control means for controlling the focus detecting means on the basis of the focus signal and inhibiting a focus adjusting operation of said focus detecting means or reducing a speed thereof in accordance with the result of a discrimination of said discriminating means corresponding to a predetermined contrast condition.

8. An apparatus according to claim 7, wherein the focus detecting means detects the focus condition in accordance with a level of a high frequency component extracted from the image pickup signal and executes the focus adjustment.

9. An apparatus according to claim 8, wherein the focus detecting means detects the focus condition in accordance with a level of a signal regarding an edge width of an object image which has been extracted from the image pickup signal and executes the focus adjustment.

10. An apparatus according to claim 7, wherein the discriminating means compares levels of the chrominance level and the luminance level detected by the detecting means with predetermined levels, thereby discriminating whether an image pickup of an object can be performed or not.

11. An apparatus according to claim 10, wherein the control means inhibits the operation of the focus detecting means in the case where the discriminating means has generated the result of the discrimination indicating that the image pickup of the object is impossible.

12. An apparatus according to claim 11, further having a focusing lens for the focus point adjustment, and wherein the control means stops the driving of the focusing lens in accordance with the result of the discrimination.

13. An apparatus according to claim 12, further having warning means for executing a warning indication in the case where the discriminating means has generated the result of the discrimination indicating that the image pickup of the object is impossible.

14. An apparatus according to claim 11, further having a focusing lens for the focus point adjustment, and wherein the control means reduces a driving speed of the focusing lens in accordance with the result of the discrimination.

15. An apparatus according to claim 14, further having warning means for executing a warning indication in the case where the discriminating means has generated the result of the discrimination indicating that the image pickup of the object is impossible.

16. A video camera apparatus comprising:

(A) a focusing lens;

(B) image pickup means for photoelectrically converting an object image formed by the focusing lens and for generating an image pickup signal;

(C) focus adjusting means for extracting a predetermined signal component which changes in accordance with a focus condition from the image pickup signal and adjusting a portion of said focusing lens so that a level of said signal is maximum;

(D) detecting means for extracting a plurality of signal components of different characteristics including a chrominance signal component from the image pickup signal; and (E) control means for substantially stopping the focusing lens or reducing a speed of the adjustment of the focusing lens by said focus adjusting means in response to detection of the signal components by the detecting means which are less than predetermined levels corresponding to a low contrast condition.

17. An apparatus according to claim 16, wherein said plurality of signal components are chrominance signal components and a luminance signal component.

18. An apparatus according to claim 17, wherein the detecting means detects levels of the chrominance signal components and a level of the luminance signal component.

19. An apparatus according to claim 18, wherein the control means stops the focusing lens or reduces a speed thereof when the levels of the chrominance signal components and the luminance signal component are equal to or less than predetermined levels, respectively.

20. An apparatus according to claim 16, wherein the control means stops the focusing lens to a predetermined position in a moving range of the focusing lens.

* * * * *